(12) United States Patent
Takegishi

(10) Patent No.: US 12,119,777 B2
(45) Date of Patent: Oct. 15, 2024

(54) CONTROL CIRCUIT

(71) Applicant: NIHON DEMPA KOGYO CO., LTD., Tokyo (JP)

(72) Inventor: Shigeru Takegishi, Saitama (JP)

(73) Assignee: NIHON DEMPA KOGYO CO., LTD., Tokyo (JP)

( * ) Notice: Subject to any disclaimer, the term of this patent is extended or adjusted under 35 U.S.C. 154(b) by 141 days.

(21) Appl. No.: 18/152,731

(22) Filed: Jan. 10, 2023

(65) Prior Publication Data
US 2023/0231500 A1 Jul. 20, 2023

(51) Int. Cl.
*H02P 8/22* (2006.01)
*H02P 8/14* (2006.01)

(52) U.S. Cl.
CPC . *H02P 8/22* (2013.01); *H02P 8/14* (2013.01)

(58) Field of Classification Search
CPC ..................................... H02P 8/22; H02P 8/14
See application file for complete search history.

(56) References Cited

U.S. PATENT DOCUMENTS

| 10,505,478 | B2* | 12/2019 | Fujita | G01R 23/00 |
| 11,005,400 | B2* | 5/2021 | Yamazaki | H02P 8/36 |
| 11,448,526 | B2* | 9/2022 | Ishigami | H02P 6/16 |
| 2015/0028790 | A1* | 1/2015 | Qu | H02P 8/12 318/696 |
| 2016/0218648 | A1* | 7/2016 | Hijikata | H02P 8/12 |

FOREIGN PATENT DOCUMENTS

JP 2019097254 6/2019

* cited by examiner

*Primary Examiner* — Thai T Dinh
(74) *Attorney, Agent, or Firm* — JCIPRNET

(57) ABSTRACT

A control circuit includes a storage unit, a generation unit, an update unit, and a rotation control unit. The storage unit stores a predetermined number of register values to designate a step frequency of a stepper motor. The generation unit generates a micro step clock signal every time a period corresponding to each of the predetermined number of register values stored in the storage unit elapses. The update unit updates the predetermined number of register values stored in the storage unit every time the generation unit generates the predetermined number of micro step clock signals. The rotation control unit supplies a phase current based on the micro step clock signal generated by the generation unit to the stepper motor to rotate a rotor of the stepper motor by a micro step angle found by equally dividing a step angle of the stepper motor into the predetermined number.

5 Claims, 8 Drawing Sheets

CONTROL CIRCUIT

CROSS-REFERENCE TO RELATED APPLICATIONS

This application is based on and claims priority under 35 U.S.C. § 119 to Japanese Patent Application No. 2022-004786, filed on Jan. 17, 2022, the entire content of which is incorporated herein by reference.

TECHNICAL FIELD

This disclosure relates to a control circuit for controlling a stepper motor.

DESCRIPTION OF THE RELATED ART

For effective torque control of a stepper motor, controlling an electrical angle of the stepper motor in a plurality of phases of micro steps has been proposed (for example, Japanese Unexamined Patent Application Publication No. 2019-97254).

To control the stepper motor in the micro steps, a micro step pulse corresponding to each micro step needs to be input to the stepper motor, and periods of the micro step pulses need to be set for each pulse. However, for high speed driving of the stepper motor, there was a problem that micro step control of the stepper motor was not able to be achieved due to insufficient time required to set the periods of the micro step pulses.

A need thus exists for a control circuit which is not susceptible to the drawback mentioned above.

SUMMARY

A control circuit according to a first aspect of this disclosure controls a stepper motor in a micro step. The control circuit includes a storage unit, a generation unit, an update unit, and a rotation control unit. The storage unit stores a predetermined number of register values to designate a step frequency of the stepper motor. The generation unit generates a micro step clock signal every time a period corresponding to each of the predetermined number of register values stored in the storage unit elapses. The update unit updates the predetermined number of register values stored in the storage unit every time the generation unit generates the predetermined number of micro step clock signals. The rotation control unit supplies a phase current based on the micro step clock signal generated by the generation unit to the stepper motor to rotate a rotor of the stepper motor by a micro step angle found by equally dividing a step angle of the stepper motor into the predetermined number.

BRIEF DESCRIPTION OF THE DRAWINGS

The foregoing and additional features and characteristics of this disclosure will become more apparent from the following detailed description considered with reference to the accompanying drawings, wherein.

DETAILED DESCRIPTION

First Embodiment

Outline of Inspection System

Figure 1:
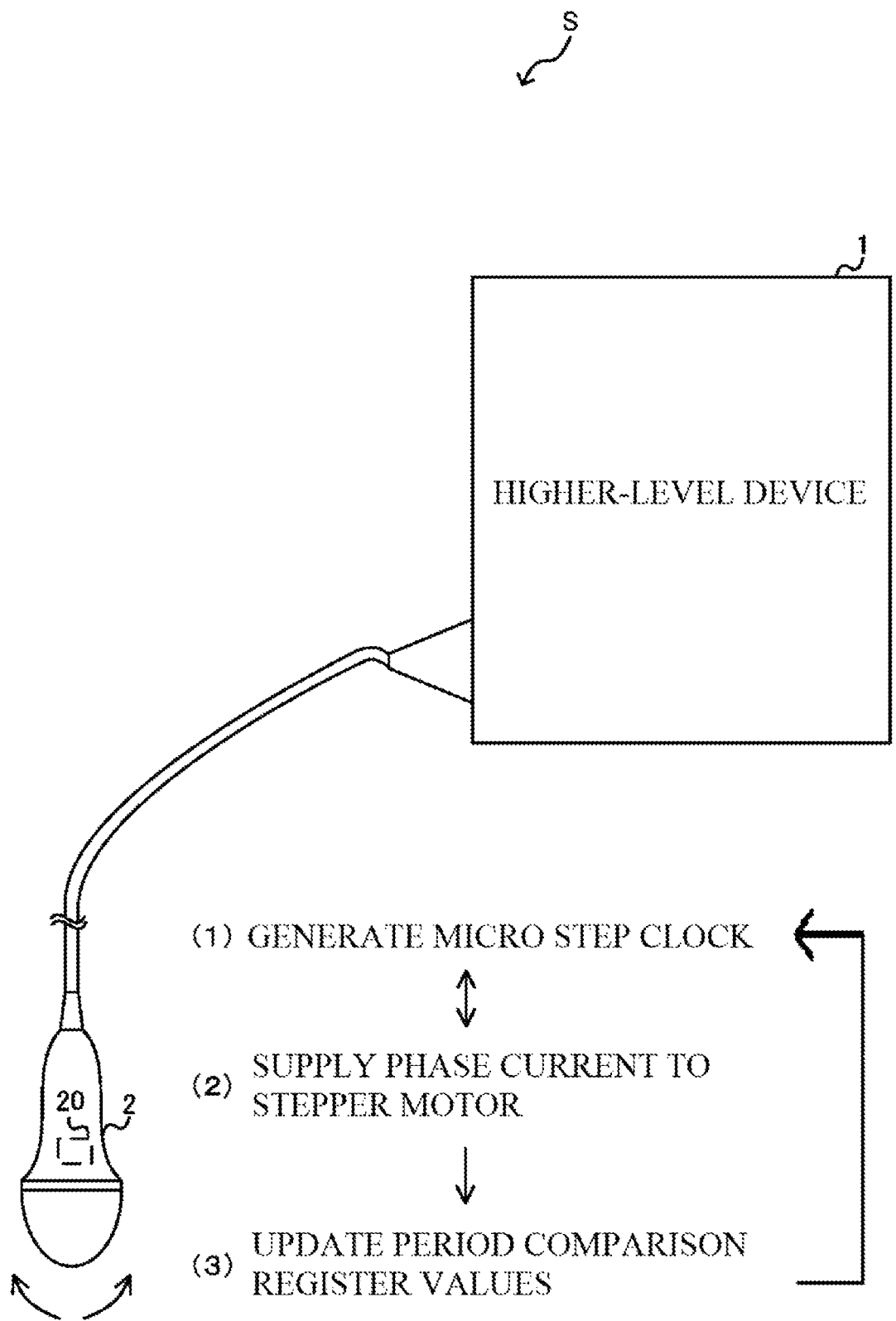
FIG. 1 illustrates an outline of an inspection system according to a first embodiment.

FIG. 1 illustrates an outline of an inspection system S according to the first embodiment. The inspection system S is, for example, a system used to probe, for example, a lesion inside a body of a patient by ultrasonic sound wave. The inspection system S includes a higher-level device 1 and an ultrasonic probe 2 connected to the higher-level device 1.

The higher-level device 1 is connected to the ultrasonic probe 2 with a cable. The ultrasonic probe 2 generates an ultrasonic sound wave to, for example, probe a lesion inside of a body of a patient. The ultrasonic probe 2 swings an ultrasonic sound wave lens (not illustrated) to converge the ultrasonic sound wave as indicated by the arrows in FIG. 1 by a built-in stepper motor to form an ultrasonic wave beam so as to scan, for example, an inside of a body of a patient.

The ultrasonic probe 2 includes a control circuit 20. The control circuit 20 increases and decreases a current supplied to a winding of the stepper motor in phases to control the stepper motor in micro steps that divide a step angle. While the control circuit 20 is disposed inside the ultrasonic probe 2 in FIG. 1, when the end portion shape of the ultrasonic probe 2 is small, the control circuit 20 may be disposed inside the higher-level device 1. The location of the control circuit 20 is determined considering, for example, the shape of the ultrasonic probe 2 and the cable length affecting a noise.

The control circuit 20 refers to an array of the predetermined number of period comparison register values and generates a micro step clock signal every time a counter value output by a built-in timer becomes larger than the next period comparison register value ((1) in FIG. 1). The control circuit 20 supplies a phase current based on the generated micro step clock signal to the stepper motor ((2) in FIG. 1) to rotate a rotor of the stepper motor in units of micro steps and to allow smooth scan of the ultrasonic wave beam.

The control circuit 20 updates the array of the predetermined number of period comparison register values stored in a storage unit every time the predetermined number of micro step clock signals are generated ((3) in FIG. 1). Thus, the control circuit 20 batch-updates the array of the predetermined number of period comparison register values. Accordingly, compared with a case of updating the period comparison register value every time one micro step clock signal is generated, a time required to update one period comparison register value can be shortened. In view of this, the control circuit 20 allows reduction in failing to achieve the micro step due to insufficient time to update the period comparison register value even when the stepper motor is driven at a comparatively high speed.

Ultrasonic Probe 2

Figure 2:
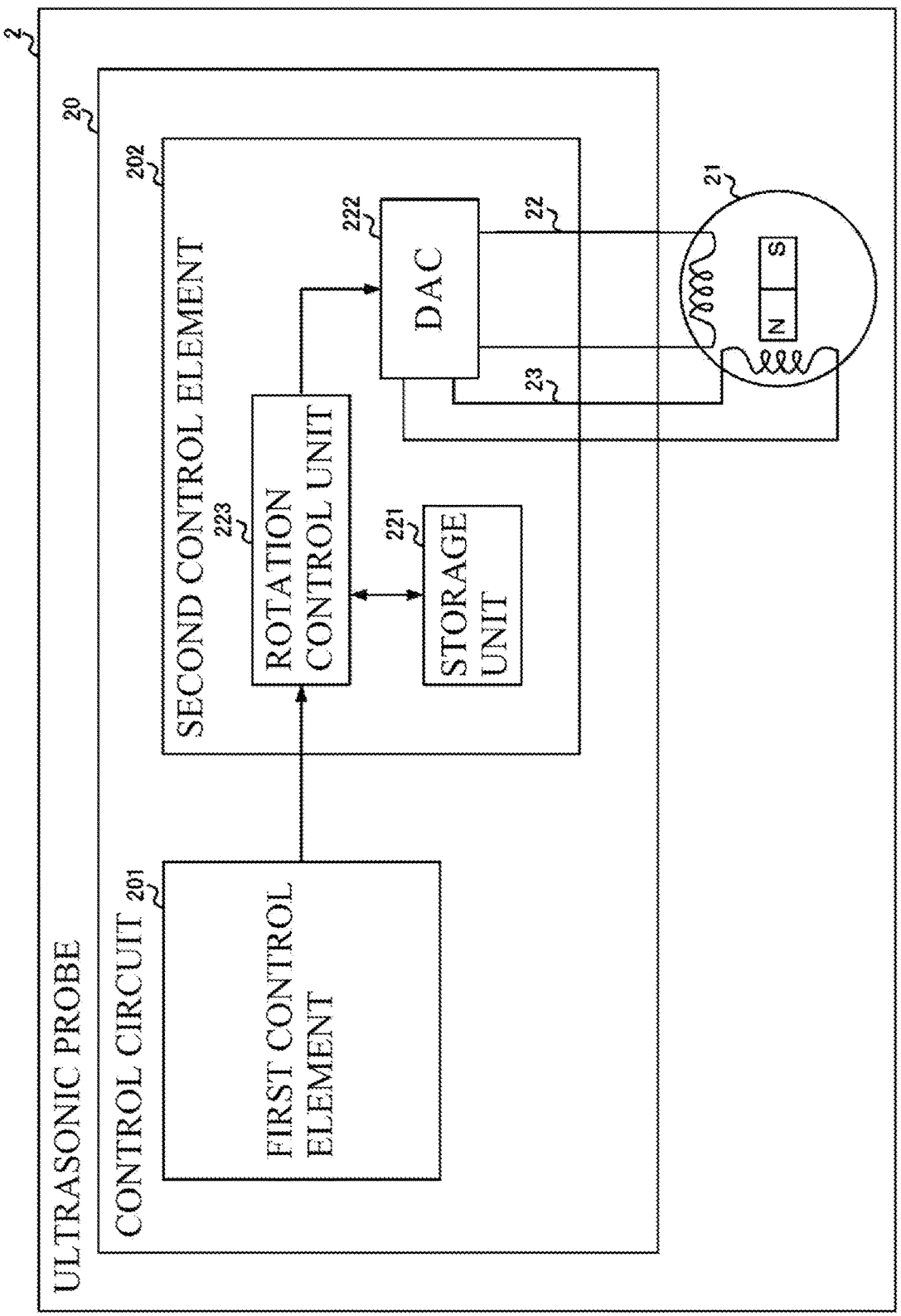
FIG. 2 illustrates a configuration of an ultrasonic probe.

FIG. 2 illustrates a configuration of the ultrasonic probe 2. The ultrasonic probe 2 includes the control circuit 20 and a stepper motor 21. The control circuit 20 includes a first control element 201 and a second control element 202. The first control element 201 is, for example, a microprocessor.

The second control element 202 is, for example, a motor driver Integrated Circuit (IC). The second control element 202 includes a storage unit 221, a Digital Analog Converter (DAC) 222, and a rotation control unit 223.

In the example of FIG. 2, the stepper motor 21 is a two-phase stepper motor. The stepper motor 21 is not limited to this, and may be a five-phase stepper motor. The stepper motor 21 swings an acoustic lens mounted on the ultrasonic probe 2.

The first control element 201 generates the micro step clock signal that instructs a step frequency of the stepper motor 21. The first control element 201 outputs the generated micro step clock signal to the second control element 202.

The storage unit 221 is a storage medium including, for example, a Read Only Memory (ROM) and a Random Access Memory (RAM). The storage unit 221 stores programs executed by the rotation control unit 223.

The DAC 222 converts a digital control signal generated by the rotation control unit 223 into an analog current. In the example of this specification, the DAC 222 is configured by a plurality of DACs. The DAC 222 is connected to a phase A winding of the stepper motor 21 via a cable 22. The DAC 222 is connected to a phase B winding of the stepper motor 21 via a cable 23. The DAC 222 supplies the phase currents to the respective phase A winding and phase B winding of the stepper motor 21 based on the digital control signal output by the rotation control unit 223.

The rotation control unit 223 is connected to the DAC 222. The rotation control unit 223 supplies the phase current to the stepper motor 21 by the DAC 222. The rotation control unit 223 supplies the phase current based on the micro step clock signal generated by the first control element 201 to the stepper motor 21 to rotate the rotor of the stepper motor 21 by the micro step angle. The micro step angle is an angle found by equally dividing the step angle of the stepper motor 21 into the predetermined number.

Figure 3A:
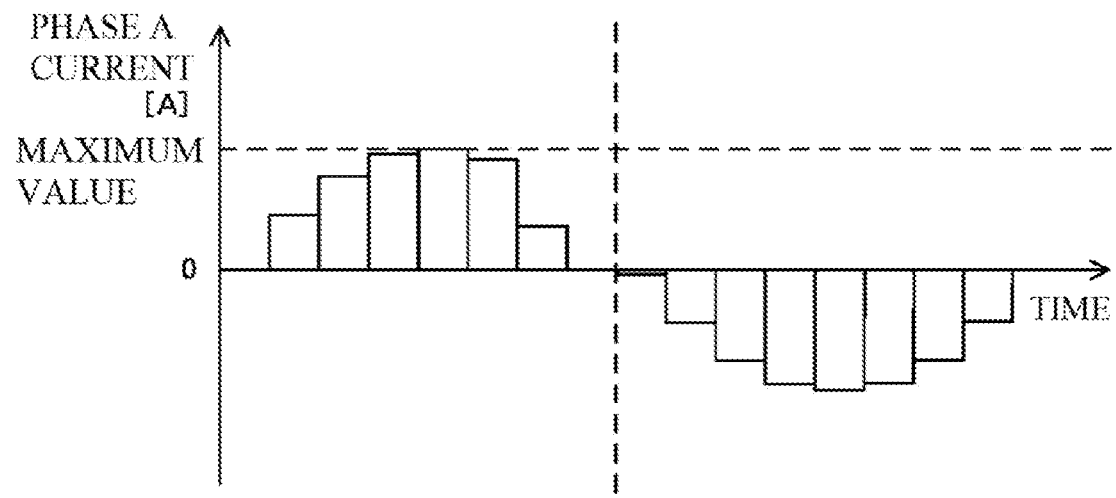
FIG. 3A and FIG. 3B illustrate a change in a phase current supplied to a stepper motor by a rotation control unit.
Figure 3B:
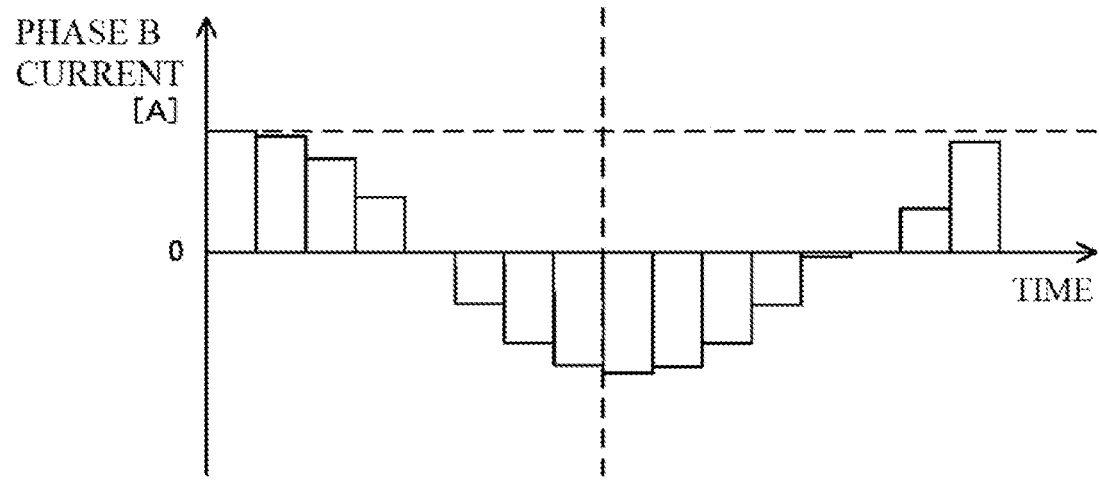

FIG. 3A and FIG. 3B illustrate a change in the phase current supplied from the rotation control unit 223 to the stepper motor 21. FIG. 3A illustrates the change in current supplied to the phase A winding of the stepper motor 21. FIG. 3B illustrates a change in current supplied to the phase B winding of the stepper motor 21.

As illustrated in FIG. 3A, the rotation control unit 223 controls a phase A current supplied to the phase A winding of the stepper motor 21 such that a plurality of values are taken between 0 ampere (A) and the maximum value. Similarly, the rotation control unit 223 controls a phase B current supplied to the phase B winding of the stepper motor 21 as illustrated in FIG. 3B. The graph of the phase B current illustrated in FIG. 3B is similar to the graph of the phase A current illustrated in FIG. 3A excluding the point of the phase proceeding by 90 degrees. The rotation control unit 223 rotates the rotor of the stepper motor 21 in units of the micro steps to control the phase A current and the phase B current so as to have waveforms close to a sine wave, thus ensuring suppressing a vibration and a noise in association with step driving.

Configuration of First Control Element 201

Figure 4:
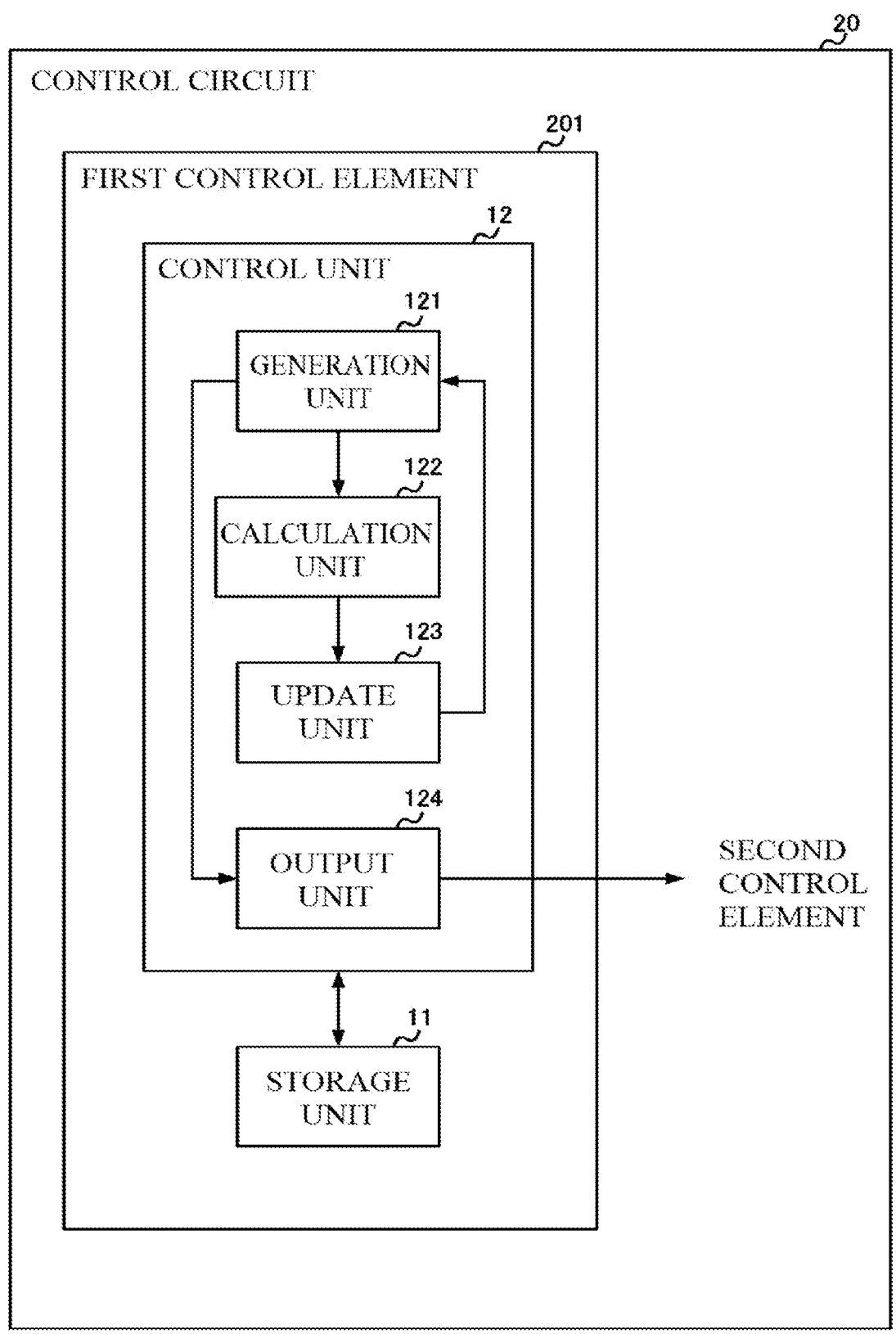
FIG. 4 illustrates a configuration of a first control element.

FIG. 4 illustrates the configuration of the first control element 201. The first control element 201 includes a storage unit 11 and a control unit 12. The storage unit 11 is a storage medium including, for example, a ROM and a RAM. The storage unit 11 stores programs executed by the control unit 12. The storage unit 11 stores the array of the predetermined number of period comparison register values to designate the step frequency of the stepper motor 21. The predetermined number is determined, for example, according to inspection accuracy required for the ultrasonic probe 2.

The predetermined number of period comparison register values may be respective different values. A part of or all of the predetermined number of period comparison register values may be the same value. The storage unit 11 stores the array of the predetermined number of auto reload register values to designate the step frequency of the stepper motor 21. In an example of this specification, the period comparison register value is a value half of the corresponding auto reload register value. The control unit 12 is, for example, a Central Processing Unit (CPU). The control unit 12 executes the program stored in the storage unit 11 to function as a generation unit 121, a calculation unit 122, an update unit 123, and an output unit 124.

The generation unit 121 generates various signals. Every time the period corresponding to each of the predetermined number of period comparison register values stored in the storage unit 11 elapses, the generation unit 121 generates the micro step clock signal.

Figure 5:
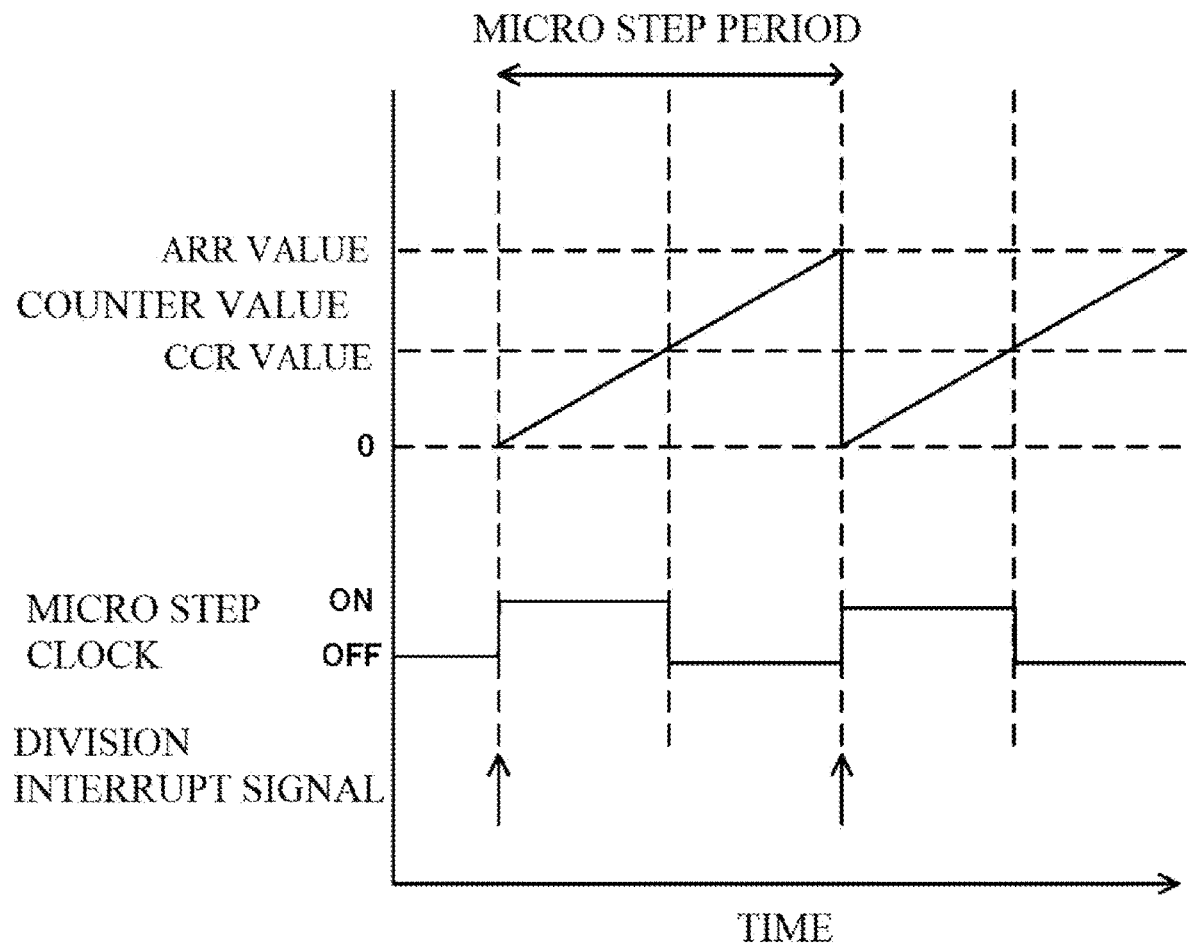
FIG. 5 illustrates an example of a timing of generating a micro step clock signal by a generation unit.

FIG. 5 illustrates an example of the timing of generating the micro step clock signal by the generation unit 121. FIG. 5 illustrates a counter value output by a timer (not illustrated) mounted on the first control element 201 and ON/OFF states of the micro step clock signal. The up arrows in FIG. 5 indicate a timing of generating a division interrupt signal by the generation unit 121.

As illustrated in FIG. 5, the counter value output by the timer increases in a constant pace from 0. The generation unit 121 refers to the array of the predetermined number of period comparison register values stored in the storage unit 11 and switches the micro step clock signal from the ON state to the OFF state when the next period comparison register value (a CCR value in FIG. 5) matches the counter value.

The generation unit 121 refers to the array of the predetermined number of auto reload register values (ARR values in the FIG. 5) stored in the storage unit 11 and switches the micro step clock signal from the OFF state to the ON state when the next auto reload register value matches the counter value. The generation unit 121 reloads the counter value to 0 when the next auto reload register value matches the counter value, and as indicated by the up arrow in FIG. 5, generates the division interrupt signal. FIG. 5 illustrates the micro step period from when the counter value of the timer is reloaded to 0 until the counter value is reloaded to 0 next.

The generation unit 121 generates a full step clock signal to rotate the stepper motor not corresponding to the micro step in units of steps. The generation unit 121 generates a whole interrupt signal at a timing of the full step clock signal rising from the OFF state to the ON state. The generation unit 121 outputs the generated micro step clock signal and full step clock signal to the output unit 124. The generation unit 121 outputs the generated division interrupt signal and whole interrupt signal to the calculation unit 122.

The calculation unit 122 calculates the array of the predetermined number of period comparison register values. For example, to increase the step frequency of the stepper motor 21, the calculation unit 122 decreases the period comparison register values in order. On the other hand, to reduce the step frequency of the stepper motor 21, the calculation unit 122 increases the period comparison register values in order.

Figure 6:
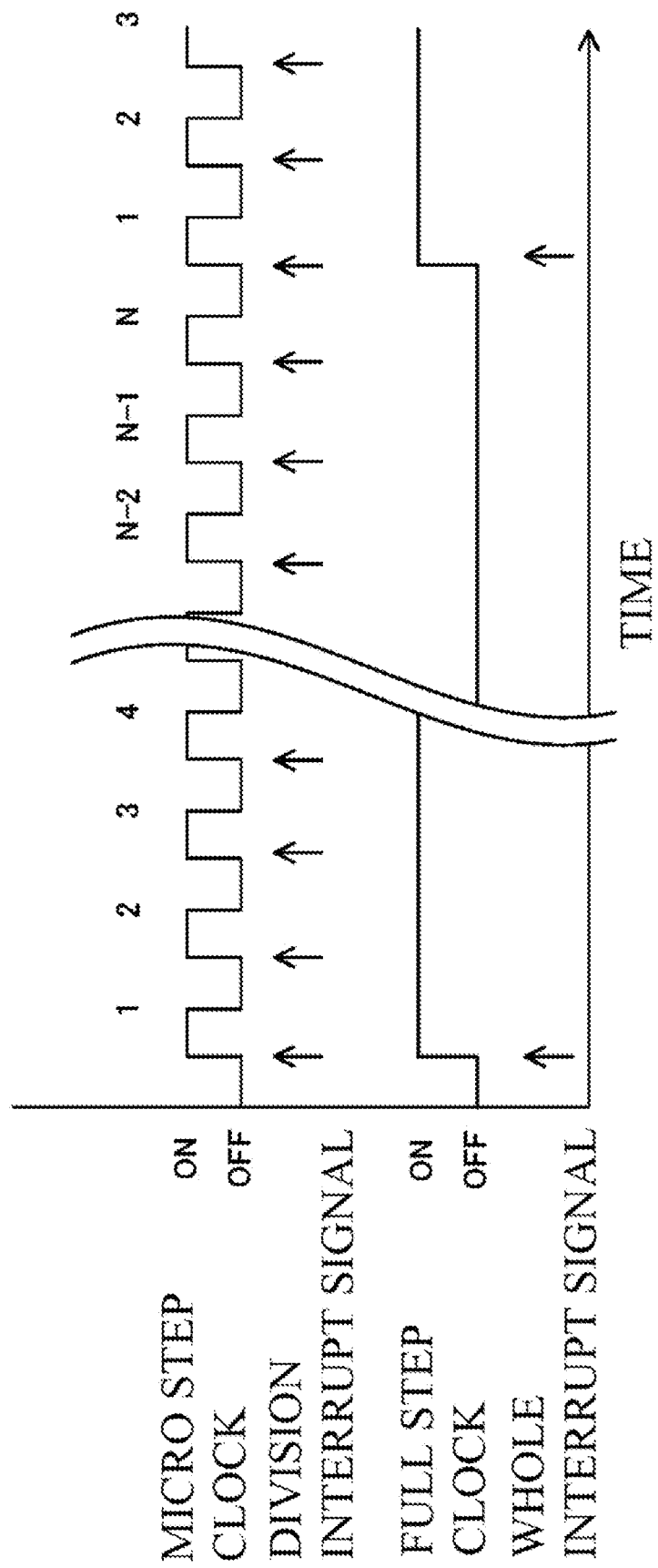
FIG. 6 is a drawing for describing a timing of calculating a period comparison register by a calculation unit.

The calculation unit 122 calculates the predetermined number of period comparison register values every time the generation unit 121 generates the predetermined number of micro step clock signals. FIG. 6 is a drawing for describing a timing of calculating the period comparison register by the calculation unit 122. FIG. 6 illustrates the ON/OFF states of the micro step clock signal, and the generation timing of the division interrupt signal and the generation timing of the whole interrupt signal are indicated by the up arrows in FIG. 6. While FIG. 6 illustrates an example in which the pulse width of the micro step clock signal is constant, the pulse width of the micro step clock signal varies according to the corresponding period comparison register value.

In the example of FIG. 6, the calculation unit 122 generates N pieces of the period comparison register values every time the generation unit 121 generates N pieces of the first to N-th micro step clock signals. The calculation unit 122 starts calculating N pieces of the period comparison register values at the timing of generating the whole interrupt signal by the generation unit 121. The N pieces of calculated period comparison register values are used to determine the switch timing of ON/OFF of the micro step clock signal at and after the timing of generating the next whole interrupt signal. The calculation unit 122 outputs the array of the calculated period comparison register values to the update unit 123.

Every time the generation unit 121 generates the predetermined number of micro step clock signals, the update unit 123 updates the predetermined number of period comparison register values stored in the storage unit 11 to the predetermined number of period comparison register values calculated by the calculation unit 122. In the example of FIG. 6, after the calculation unit 122 calculates the array of N pieces of the period comparison register values while the generation unit 121 generates N pieces of the first to N-th micro step clock signals, the update unit 123 causes the storage unit 11 to store the array of N pieces of the calculated period comparison register values to update the period comparison register values. At this time, before the next whole interrupt signal is generated, the update unit 123 causes the storage unit 11 to store the array of N pieces of the calculated period comparison register values.

The update unit 123 is not limited to the example in which after the calculation unit 122 calculates all of N pieces of the period comparison register values, the update unit 123 starts the process of causing the storage unit 11 to store the array of N pieces of the calculated period comparison register values. For example, the update unit 123 may start the process of causing the storage unit 11 to store the array of the period comparison register values at a timing when the calculation unit 122 calculates a part of the period comparison register values.

The N pieces of the period comparison register values stored in the storage unit 11 are used by the generation unit 121 to determine the switch timing of ON/OFF of the micro step clock signal at and after the timing of generating the next whole interrupt signal. The update unit 123 is not limited to the example in which the update unit 123 updates the period comparison register values stored in the storage unit 11. For example, the update unit 123 may update the auto reload register values stored in the storage unit 11.

The output unit 124 of FIG. 4 communicates with the second control element 202 via a cable. The output unit 124 outputs the micro step clock signal generated by the generation unit 121 to the second control element 202.

Effect Brought by Inspection System S of First Embodiment

With the inspection system S according to the first embodiment, the calculation unit 122 and the update unit 123 batch-update the array of the predetermined number of period comparison register values, and therefore the time required to update one period comparison register can be shortened compared with the case of updating the array of the period comparison register values every time one micro step clock signal is generated. In view of this, the calculation unit 122 and the update unit 123 allow reduction in failing to achieve the micro step due to insufficient time to update the period comparison register values even in a state of driving the stepper motor 21 at a comparatively high speed.

Second Embodiment

In the first embodiment, the example in the case where the rotation control unit 223 rotates the rotor of the stepper motor 21 in the same micro step angle unit in the constant speed driving mode in which the stepper motor 21 performs constant speed driving and in the acceleration/deceleration driving mode in which the stepper motor 21 performs acceleration/deceleration driving has been described. In the second embodiment, an example in a case where the rotation control unit 223 rotates the rotor of the stepper motor 21 in different micro step angle units in the constant speed driving mode and the acceleration/deceleration driving mode will be described.

The generation unit 121 generates a first micro step clock signal every time the period corresponding to each of a first predetermined number of period comparison register values stored in the storage unit 11 elapses in the constant speed driving mode. In the constant speed driving mode, the generation unit 121 refers to the array of the first predetermined number of period comparison register values stored in the storage unit 11 and generates the first micro step clock signal every time the counter value output by the built-in timer becomes larger than the next period comparison register value.

The generation unit 121 generates a second micro step clock signal every time the period corresponding to each of a second predetermined number of period comparison register values stored in the storage unit 11 elapses in the acceleration/deceleration driving mode. The second predetermined number is smaller than the first predetermined number. In the acceleration/deceleration driving mode, the generation unit 121 refers to the array of the second predetermined number of period comparison register values stored in the storage unit 11 and generates the second micro step clock signal every time the counter value output by the built-in timer becomes larger than the next period comparison register value.

In the constant speed driving mode, the rotation control unit 223 supplies the phase current based on the first micro step clock signal generated by the generation unit 121 to the stepper motor 21 to rotate the rotor of the stepper motor 21 by the first micro step angle. The first micro step angle is a value found by equally dividing the step angle of the stepper motor 21 into the first predetermined number.

In the acceleration/deceleration driving mode, the rotation control unit 223 supplies the phase current based on the second micro step clock signal generated by the generation unit 121 to the stepper motor 21 to rotate the rotor of the stepper motor by the second micro step angle. The second micro step angle is a value found by equally dividing the step angle of the stepper motor 21 into the second predetermined number.

Figure 7:
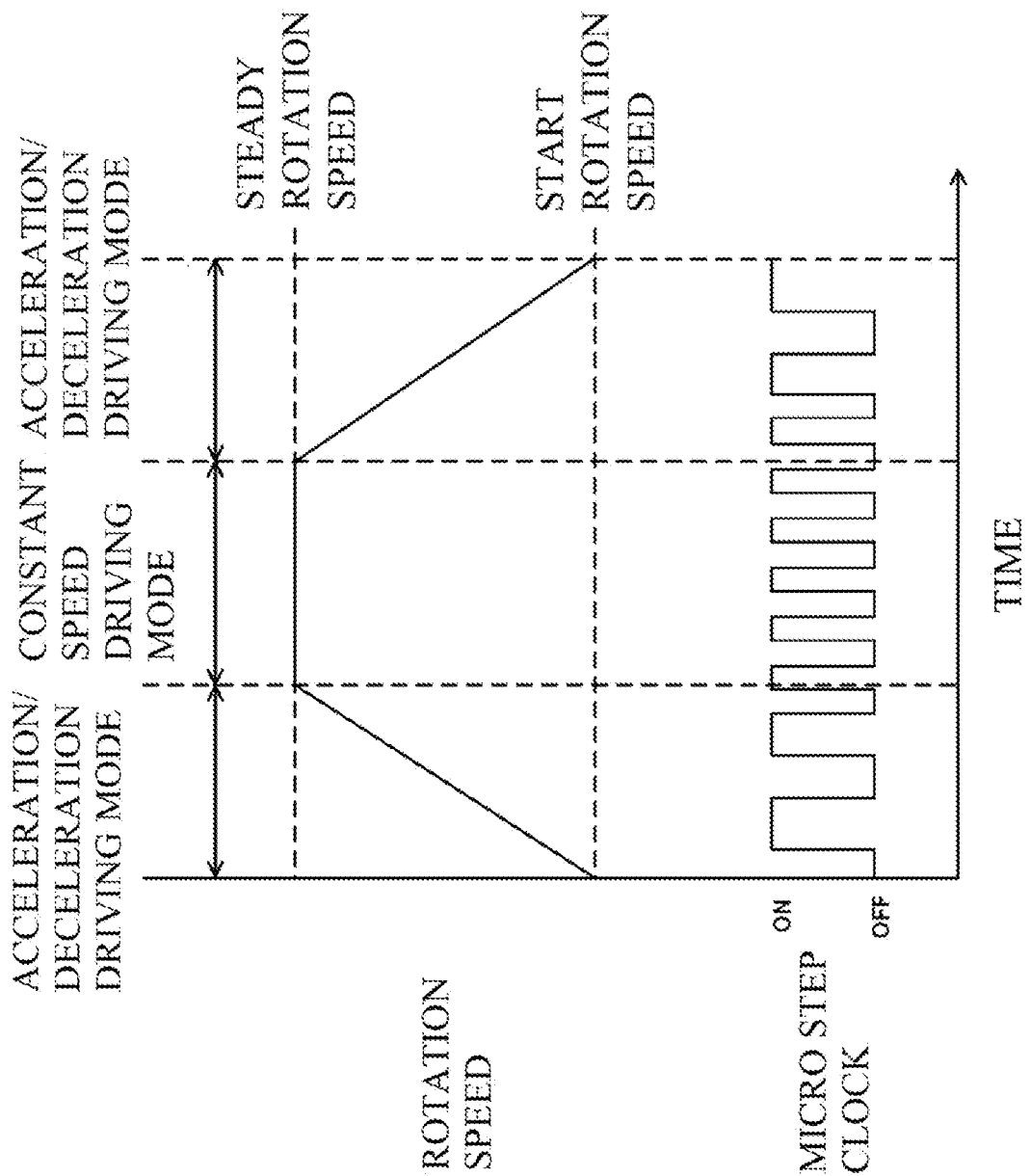
FIG. 7 illustrates an example of generating a micro step clock signal by a generation unit according to a second embodiment.

FIG. 7 illustrates an example of generating the micro step clock signal by the generation unit 121 according to the second embodiment. FIG. 7 illustrates the ON/OFF states of the micro step clock signal and the change in rotation speed of the stepper motor 21. As illustrated in FIG. 7, while the rotation speed of the stepper motor 21 increases from the redetermined start rotation speed up to a steady rotation speed, the generation unit 121 operates in the acceleration/deceleration driving mode and generates the first micro step clock signal. The start rotation speed is the rotation speed immediately after the start of the stepper motor 21. One example of the start rotation speed is 0 rpm. The steady rotation speed is, for example, the maximum value of the rotation speed when the stepper motor 21 is controlled by the micro step.

When the rotation speed of the stepper motor 21 reaches the steady rotation speed, the generation unit 121 operates in the constant speed driving mode and generates the second micro step clock signal. While the rotation speed of the stepper motor 21 decreases from the steady rotation speed to the start rotation speed, the generation unit 121 operates in the acceleration/deceleration driving mode and generates the first micro step clock signal.

The rotation control unit 223 rotates the rotor of the stepper motor 21 in units of the first micro step angles in the acceleration/deceleration driving mode and rotates the rotor of the stepper motor 21 in units of second micro step angles smaller than the first micro step angle in the constant speed driving mode. Thus, the rotation control unit 223 can suppress insufficient time for updating the period comparison register value in the acceleration/deceleration driving mode during which, for example, generation of an ultrasonic image by the ultrasonic probe 2 is not performed. On the other hand, the generation unit 121 suppresses a vibration and a noise in association with the step driving in the constant speed driving mode during which, for example, generation of the ultrasonic image by the ultrasonic probe 2 is performed, thus ensuring improving inspection accuracy.

Third Embodiment

In the third embodiment, an example when the calculation unit 122 calculates the period comparison register value using a correction value will be described. In the third embodiment, the calculation unit 122 calculates reference values by the number smaller than the predetermined number and a correction value. The number smaller than the predetermined number is two in an example of this specification. The calculation unit 122 calculates the correction value based on the calculated reference value. For example, the calculation unit 122 calculates the correction value by the correction value=(difference between the two reference values)/(predetermined number−1) . . . (1).

Figure 8:
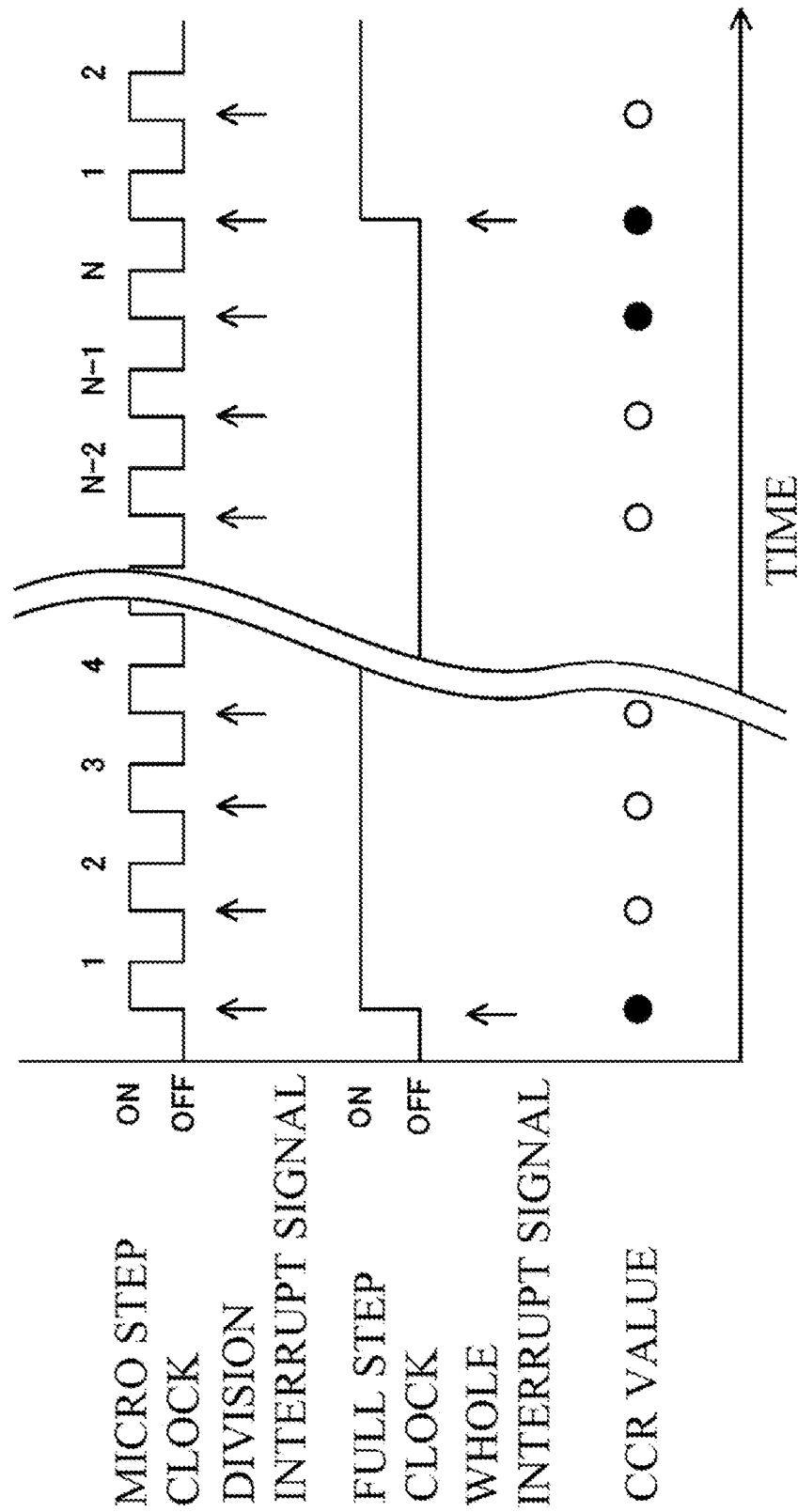
FIG. 8 is a drawing for describing a calculation method of the period comparison register value by the calculation unit.

The calculation unit 122 calculates the predetermined number of period comparison register values by an operation using any of the calculated reference values and the calculated correction value. For example, the calculation unit 122 calculates the predetermined number of period comparison register values using a linear interpolation of the reference value by adding or subtracting the correction value to/from the calculated reference value. FIG. 8 is a drawing for describing the calculation method of the period comparison register value (the CCR value in FIG. 8) by the calculation unit 122. FIG. 8 illustrates the ON/OFF states of the micro step clock signal and the ON/OFF states of the full step clock signal. The up arrows in FIG. 8 indicate the timing of generating the division interrupt signal and the timing of generating the whole interrupt signal.

The black circles in FIG. 8 indicate the timing of generating the micro step clock signal generated by the generation unit 121 using the reference value calculated by the calculation unit 122 as the period comparison register value. The white circles in FIG. 8 indicate the timing of generating the micro step clock signal generated by the generation unit 121 using the period comparison register value calculated by adding the correction value to the reference value.

In the example of FIG. 8, the calculation unit 122 calculates a first reference value and a second reference value as the reference values. The calculation unit 122 calculates the first reference value as the first period comparison register value and the second reference value as the N-th period comparison register value. The calculation unit 122 calculates the k-th (k=2, 3, . . . , N−1) period comparison register value using a formula of (k-th period comparison register value)=((k−1)-th period comparison register value)+correction value. Additionally, the calculation unit 122 may calculate the k-th period comparison register value using a formula of (k-th period comparison register value=((k−1) period comparison register value)−correction value.

Thus, the calculation unit 122 calculates the predetermined number of period comparison register values by linear interpolation using the correction value in the acceleration/deceleration driving mode. The calculation unit 122 calculates the period comparison register value in the constant speed driving mode by the method similar to that of the first embodiment.

Effect Brought by Inspection System S of Third Embodiment

With the inspection system S according to the third embodiment, the calculation unit 122 calculates the predetermined number of period comparison register values by linear interpolation, and therefore the time required to calculate the period comparison register value can be shortened. In view of this, the calculation unit 122 allows reduction in failing to achieve the micro step due to insufficient time required to calculate the predetermined number of period comparison register values.

Every time a period corresponding to each of a first predetermined number of register values stored in the storage unit elapses, the generation unit may generate the micro step clock signal in a constant speed driving mode in which the stepper motor performs constant speed driving. Every time a period corresponding to each of a second predetermined number of register values smaller than the first predetermined number stored in the storage unit elapses, the generation unit may generate the micro step clock signal in an acceleration/deceleration driving mode in which the stepper motor performs acceleration/deceleration driving. The rotation control unit in the constant speed driving mode may supply the phase current based on the micro step clock signal generated by the generation unit to the stepper motor to rotate the rotor of the stepper motor by a first micro step angle found by equally dividing the step angle of the stepper motor into the first predetermined number. The rotation control unit in the acceleration/deceleration driving mode may supply the phase current based on the micro step clock signal generated by the generation unit to the stepper motor to rotate the rotor of the stepper motor by a second micro step angle found by equally dividing the step angle of the stepper motor into the second predetermined number.

The control circuit may further include a calculation unit. The calculation unit may calculate reference values by the number smaller than the predetermined number and a correction value. The calculation unit may calculate the predetermined number of register values by an operation using any of the calculated reference values and the calculated correction value. Every time the generation unit generates the predetermined number of micro step clock signals, the update unit may update the predetermined number of register values stored in the storage unit to the predetermined number of register values calculated by the calculation unit.

The calculation unit may calculate the predetermined number of register values using a linear interpolation of the reference value by adding or subtracting the correction value to/from the calculated reference value. The rotation control unit may rotate the rotor of the stepper motor that swings an acoustic lens mounted on an ultrasonic probe.

This disclosure provides an effect of ensuring controlling the stepper motor in micro steps while driving the stepper motor at a further high speed.

The principles, exemplary embodiment and mode of operation of the disclosure have been described in the foregoing specification. However, the disclosure which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the disclosure. Accordingly, it is expressly intended that all such variations, changes and equivalents which fall within the spirit and scope of the disclosure as defined in the claims, be embraced thereby.

What is claimed is:

1. A control circuit for controlling a stepper motor in a micro step, the control circuit comprising:
    a storage unit that stores a predetermined number of register values to designate a step frequency of the stepper motor;
    a generation unit that generates a micro step clock signal every time a period corresponding to each of the predetermined number of register values stored in the storage unit elapses;
    an update unit that updates the predetermined number of register values stored in the storage unit every time the generation unit generates the predetermined number of micro step clock signals; and
    a rotation control unit that supplies a phase current based on the micro step clock signal generated by the generation unit to the stepper motor to rotate a rotor of the stepper motor by a micro step angle found by equally dividing a step angle of the stepper motor into the predetermined number.

2. The control circuit according to claim 1, wherein
    every time a period corresponding to each of a first predetermined number of register values stored in the storage unit elapses, the generation unit generates the micro step clock signal in a constant speed driving mode in which the stepper motor performs constant speed driving, and every time a period corresponding to each of a second predetermined number of register values smaller than the first predetermined number stored in the storage unit elapses, the generation unit generates the micro step clock signal in an acceleration/deceleration driving mode in which the stepper motor performs acceleration/deceleration driving, and
    the rotation control unit in the constant speed driving mode supplies the phase current based on the micro step clock signal generated by the generation unit to the stepper motor to rotate the rotor of the stepper motor by a first micro step angle found by equally dividing the step angle of the stepper motor into the first predetermined number, and the rotation control unit in the acceleration/deceleration driving mode supplies the phase current based on the micro step clock signal generated by the generation unit to the stepper motor to rotate the rotor of the stepper motor by a second micro step angle found by equally dividing the step angle of the stepper motor into the second predetermined number.

3. The control circuit according to claim 1, further comprising
    a calculation unit that calculates reference values by a number smaller than the predetermined number, and a correction value, the calculation unit calculating the predetermined number of register values by an operation using any of the calculated reference values and the calculated correction value, wherein
    every time the generation unit generates the predetermined number of micro step clock signals, the update unit updates the predetermined number of register values stored in the storage unit to the predetermined number of register values calculated by the calculation unit.

4. The control circuit according to claim 3, wherein
    the calculation unit calculates the predetermined number of register values using a linear interpolation of the reference value by adding or subtracting the correction value to/from the calculated reference value.

5. The control circuit according to claim 1, wherein
    the rotation control unit rotates the rotor of the stepper motor that swings an acoustic lens mounted on an ultrasonic probe.

* * * * *

UNITED STATES PATENT AND TRADEMARK OFFICE
CERTIFICATE OF CORRECTION

PATENT NO. : 12,119,777 B2  
APPLICATION NO. : 18/152731  
DATED : October 15, 2024  
INVENTOR(S) : Shigeru Takegishi Page 1 of 1

It is certified that error appears in the above-identified patent and that said Letters Patent is hereby corrected as shown below:

On the Title Page

Item (30) Foreign Application Priority Data should read: January 17, 2022 (JP) …… 2022-004786

Signed and Sealed this  
Fourteenth Day of January, 2025

Derrick Brent  
*Acting Director of the United States Patent and Trademark Office*